United States Patent
Ohwaki (10) Patent No.: US 9,748,761 B2
(45) Date of Patent: Aug. 29, 2017

(54) OVERCURRENT DETECTION CIRCUIT, HOST USING THE SAME, AND METHOD OF DETECTING OVERCURRENT

(71) Applicant: ROHM CO., LTD., Ukyo-ku, Kyoto (JP)

(72) Inventor: Yoshinori Ohwaki, Kyoto (JP)

(73) Assignee: ROHM CO., LTD., Ukyo-Ku, Kyoto (JP)

( * ) Notice: Subject to any disclaimer, the term of this patent is extended or adjusted under 35 U.S.C. 154(b) by 244 days.

(21) Appl. No.: 14/751,874

(22) Filed: Jun. 26, 2015

(65) Prior Publication Data

US 2015/0380924 A1    Dec. 31, 2015

(30) Foreign Application Priority Data

Jun. 30, 2014  (JP) ................................ 2014-134355

(51) Int. Cl.
    *H02H 3/08*    (2006.01)
    *H02H 9/02*    (2006.01)
    *H02H 3/093*   (2006.01)

(52) U.S. Cl.
    CPC ................ *H02H 3/0935* (2013.01)

(58) Field of Classification Search
    CPC ........................ H02H 3/093; H02H 3/0935
    USPC ....................................... 361/93.7
    See application file for complete search history.

(56) References Cited

U.S. PATENT DOCUMENTS

| 4,575,673 | A  | * | 3/1986 | Tedeschi | ................... | H02J 3/14 307/10.1 |
| 5,548,467 | A  | * | 8/1996 | Heaney | .................. | H02H 3/087 323/277 |
| 2010/0202161 | A1 | * | 8/2010 | Sims | ....................... | H02M 7/02 363/20 |
| 2015/0229119 | A1 | * | 8/2015 | Tao | .......................... | H02H 3/16 361/91.1 |

FOREIGN PATENT DOCUMENTS

| JP | 2006060977 A | 3/2006 |
| JP | 2006304500 A | 11/2006 |
| JP | 2013198262 A | 9/2013 |

* cited by examiner

*Primary Examiner* — Thienvu Tran
*Assistant Examiner* — Lucy Thomas
(74) *Attorney, Agent, or Firm* — Cantor Colburn LLP (57) ABSTRACT

An overcurrent detection circuit installed in a host for supplying power to a device is disclosed. The overcurrent detection circuit includes: a detection resistor disposed on a power supply line; a current monitoring unit that compares a detected voltage that is a voltage drop across the detection resistor with a variable threshold voltage and asserts an overcurrent detection signal if the detected voltage exceeds the threshold voltage; and a control unit including a timer. The control unit is switchable among (i) a first state where the threshold voltage is set to a first value that is in accord with a reference value for overcurrent protection, (ii) a second state where the threshold voltage is set to a second value that is greater than the first value, and (iii) a third state where the threshold voltage is set to a third value that is less than the first value.

5 Claims, 8 Drawing Sheets

OVERCURRENT DETECTION CIRCUIT, HOST USING THE SAME, AND METHOD OF DETECTING OVERCURRENT

CROSS-REFERENCE TO RELATED APPLICATION

This application is based upon and claims the benefit of priority from Japanese Patent Application No. 2014-134355, filed on Jun. 30, 2014, the entire contents of which are incorporated herein by reference.

TECHNICAL FIELD

The present disclosure relates to an overcurrent detection circuit.

BACKGROUND

Battery-driven devices such as mobile phones, personal digital assistants (PDAs), note-type personal computers, portable audio players include a rechargeable secondary battery and a charging circuit for charging the battery. There is a known charging circuit that charges a secondary battery based on a DC voltage supplied from a universal serial bus (USB) host (e.g., host adaptor or source device) via a USB cable.

Currently, a charging circuit installed in a mobile device is compliant with the so-called USB battery charging specification (hereinafter referred to as BC specification). There are known several types of hosts. The BC specification, Revision 1.2 ("BC 1.2") defines a standard downstream port (SDP), a dedicated charging port (DCP), and a charging downstream port (CDP) as types of chargers. BC 1.2 also defines currents that the hosts can supply (current capacities) for each type of the chargers. Specifically, 1,500 mA is defined in the DCP and CDP, while 100 mA, 500 mA, 900 mA, etc. are defined depending on USB versions in the SDP.

As the next generation technique and system for charging a secondary battery using a USB, the so-called USB power delivery specification (hereinafter referred to as PD specification) is under development. According to the PD specification, power that can be supplied is greatly increased up to 100 W from 7.5 W in the BC specification. Specifically, the PD specification allows for the supply of 5 V or greater (more specifically 12 V and 20 V) as a USB bus voltage, and the supply of a larger current (more specifically 2 A, 3 A, and 5 A) than in the BC specification as a charging current.

In relation to overcurrent protection, the USB-PD specification defines a peak current requirement. According to the peak current requirement, even though a supply current $I_{OUT}$ exceeds a threshold value $I_{OC}$ for overcurrent protection, power keeps being supplied on the condition that the percentage of the increased supply current $I_{OUT}$ is less than a predetermined value α and the supply current $I_{OUT}$ exceeds the threshold value $I_{OC}$ for less than a predetermined time period $T_{IMAX}$.

Figure 1:
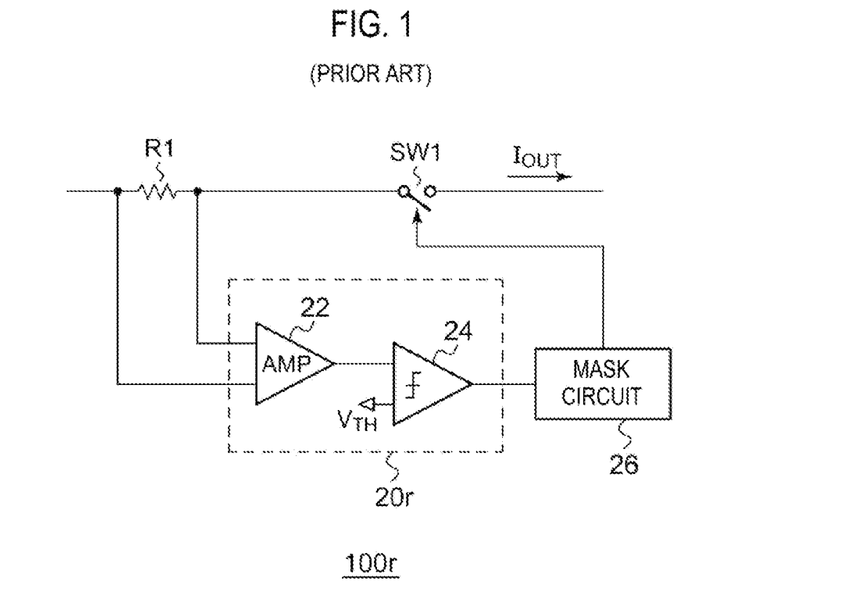
FIG. 1 describes a circuit diagram of a conventional overcurrent detection circuit.

FIG. 1 describes a circuit diagram of a conventional overcurrent detection circuit 100r. The overcurrent detection circuit 100r includes a detection resistor R1, a switch SW1, a current monitoring unit 20r, and a mask circuit 26. The current monitoring unit 20r may monitor a voltage drop (detected voltage) Vs across the detection resistor R1 and asserts an overcurrent detection signal S1 if the detected voltage Vs exceeds a predetermined threshold value. For example, the current monitoring unit 20r includes a sense amplifier 22 for amplifying the voltage drop across the detection resistor R1 and a comparator for comparing an output voltage from the sense amplifier 22 with a threshold value $V_{TH}$. The mask circuit 26 may mask an overcurrent detection (assertion of the overcurrent detection signal S1) for an extremely short period of time in order to avoid that an overcurrent state is erroneously detected due to a noise. The mask circuit 26 is configured with an analog filter, a digital timer, etc.

In the overcurrent detection circuit 110r of FIG. 1, the masking time of the mask circuit 26 was set to a predetermined time $T_{IMAX}$, to see if it meets the USB-PD specification. It was seen that during the masking time, the overcurrent detection circuit 100r could not detect an overcurrent state. Accordingly, in case that an output current $I_{OUT}$ exceeds a threshold value $I_{OC}$ for overcurrent protection during the masking time and a percentage of the increased output current $I_{OUT}$ exceeds a predetermined value α, the overcurrent detection circuit 100r could not determine that it is in an overcurrent state.

SUMMARY

The present disclosure provides some embodiments of an overcurrent detection circuit that meets the peak current requirement of the USB-PD specification and/or is also fully compliant with other specifications.

According to one embodiment of the present disclosure, there is provided an overcurrent detection circuit installed in a host for supplying power to a device. The circuit includes: a detection resistor disposed on a power supply line; a current monitoring unit that compares a detected voltage that is a voltage drop across the detection resistor with a variable threshold voltage and asserts an overcurrent detection signal if the detected voltage exceeds the threshold voltage; and a control unit including a timer. The control unit is switchable among (i) a first state where the threshold voltage is set to a first value that is in accordance with a limitation current as a reference of overcurrent protection, (ii) a second state where the threshold voltage is set to a second value that is greater than the first value, and (iii) a third state where the threshold voltage is set to a third value that is less than the first value. The control unit is configured to: (a) in the first state, if the overcurrent detection signal is asserted, transition to the second state while initiating clocking by the timer; (b) in the second state, (i) if the overcurrent detection signal is asserted, transition to an overcurrent detection state, and (ii) if the overcurrent detection signal remains negated for a predetermined first time period, transition to the third state while initiating clocking by the timer; and (c) in the third state, (i) if the overcurrent detection signal is asserted, transition to the overcurrent detection state, and (ii) if the overcurrent detection signal remains negated for a predetermined second time period, transition to the first state.

According to this embodiment, the overcurrent detection circuit can meet the peak current requirement of the USB-PD specification and/or can also be fully compliant with other specifications.

The circuit may further include a switch disposed on the power supply line in series to the detection resistor. The control unit may turn off the switch in the overcurrent detection state.

In this manner, overcurrent protection becomes possible.

According to another embodiment of the present disclosure, there is provided a host compliant with the USB-PD specification. The host includes: a detection resistor and a switch disposed on a power supply line in series to each other; a USB-PD controller that controls the switch and negotiates a bus voltage and a supply current to be supplied via the power supply line, with a device compliant with the USB-PD specification via the power supply line; a converter that has an output terminal connected to the power supply line and generates the bus voltage; and a converter controller that controls the converter so that a voltage level determined by the negotiation is output. The converter controller includes a current monitoring unit that compares a detected voltage that is a voltage drop across the detection resistor with a variable threshold voltage and asserts an overcurrent detection signal if the detected voltage exceeds the threshold voltage. The USB-PD controller includes a timer and is switchable among (i) a first state where the threshold voltage is set to a first value that is in accordance with a limitation current as a reference of overcurrent protection, (ii) a second state where the threshold voltage is set to a second value that is greater than the first value by a predetermined percentage, and (iii) a third state where the threshold voltage is set to a third value that is less than the first value by a predetermined percentage. The USB-PD controller is configured to: (a) in the first state, if the overcurrent detection signal is asserted, transition to the second state while initiating clocking by the timer; (b) in the second state, (i) if the overcurrent detection signal is asserted, turn off the switch, and (ii) if the overcurrent detection signal remains negated for a predetermined first time period, transition to the third state while initiating clocking by the timer; and (c) in the third state, (i) if the overcurrent detection signal is asserted, turn off the switch, and (ii) if the overcurrent detection signal remains negated for a predetermined second time period, transition to the first state.

According to this embodiment, overcurrent detection that meets the peak current requirement of the USB-PD specification is possible.

According to another embodiment of the present disclosure, there is provided a method of detecting an overcurrent performed in a host compliant with the USB specification. The method includes setting an overcurrent threshold value to a first value that is a reference value; comparing a supply current flowing through a power supply line with the first value; if the supply current exceeds the threshold value, setting the overcurrent threshold value to a second value that is larger than the reference value by a predetermined percentage while initiating clocking by a first timer; (i) determining an overcurrent state if the supply current exceeds the threshold value before a time counted by the first timer reaches a predetermined first time, and (ii) setting the overcurrent threshold value to a third value that is less than the reference value by a predetermined percentage while initiating clocking by a second timer if the supply current remains less than the threshold value for the first time; and (i) determining an overcurrent state if the supply current exceeds the threshold value before a time counted by the second timer reaches a predetermined second time, and (ii) setting the overcurrent threshold value to the first value, if the supply current remains less than the threshold value for the second time.

It would be appreciated that any combinations of the elements described above, the elements, or expressions that may be utilized interchangeably among methods, devices, systems, and so on, are also construed as aspects of the present disclosure.

DETAILED DESCRIPTION

Various embodiments of the present disclosure will be described below in detail with reference to the accompanying drawings. Throughout the drawings, the same or similar elements, members, and processes are denoted by the same reference numerals and redundant descriptions thereof may be omitted. The disclosed embodiments are not limited to the present disclosure, and are provided for the purpose of illustration, and all features and combinations thereof described in the embodiments should not be necessarily construed as describing the gist of the present disclosure.

As used herein, the expression "a member A is connected with a member B" may mean that member A is physically and directly connected to member B, or that member A is connected to member B via another member without substantially affect the electrical connection or without harming the functionality or effects that may be achieved by the connection.

Similarly, the expression "a member C is interposed between a member A and a member B" may indicate that the member A is directly connected to the member C or the member B is directly connected to the member C, and that the members are indirectly connected via another member without substantially affect the electrical connection or without harming the functionality or effects that may be achieved by the connections.

Figure 2:
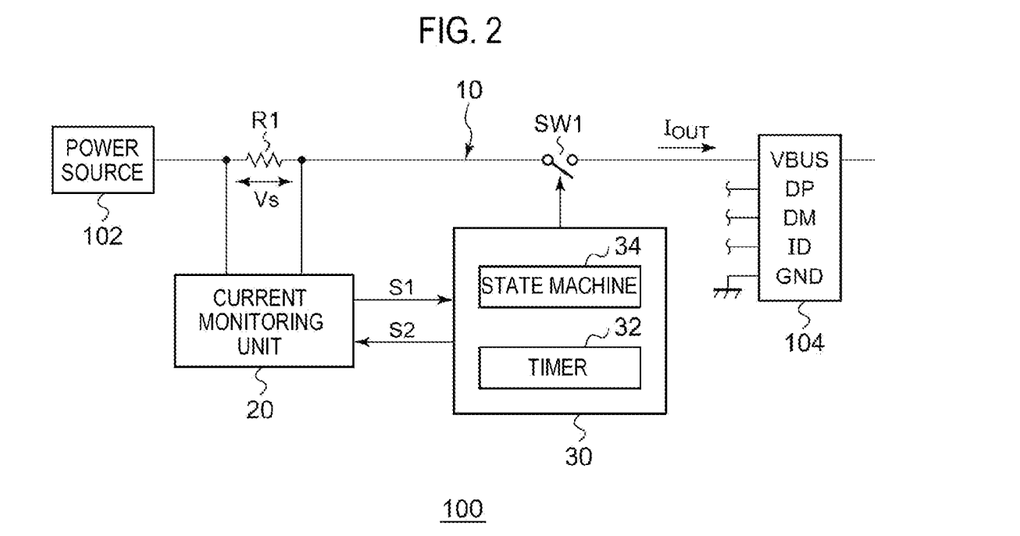
FIG. 2 depicts a circuit diagram of an overcurrent detection circuit according to one embodiment of the present disclosure.

FIG. 2 depicts a circuit diagram of an overcurrent detection circuit 100 according to one embodiment of the present disclosure. The overcurrent detection circuit 100 is installed in a USB host (source device) compliant with the USB-PD specification, and is disposed between an output terminal of a power source 102 for feeding power and a USB port 104. The overcurrent detection circuit 100 includes a power supply line 10, a detection resistor R1, a switch SW1, a current monitoring unit 20 and a control unit 30.

The detection resistor R1 and the switch SW1 are connected in series on the power supply line ($V_{BUS}$ line) 10. A voltage drop Vs (hereinafter referred to as detected voltage) across the detection resistor R1 is generated in proportion to a supply current $I_{OUT}$ flowing through the power supply line 10. The switch SW1 may be configured with a field effect transistor (FET) switch.

The current monitoring unit 20 compares the detected voltage Vs, i.e., the voltage drop across the detection resistor R1 with a variable threshold voltage $V_{TH}$ and asserts an overcurrent detection signal S1 if the detected voltage Vs exceeds the threshold voltage $V_{TH}$.

The control unit 30 includes a timer 32 and a state machine 34. The state machine 34 is able to switch between a first state φ1 to a third state φ3 and an overcurrent detection state φ4. The state machine 34 is configured to: (i) in the first state φ1, set the threshold voltage $V_{TH}$ of the current monitoring unit 20 to a first value $V_{TH1}$ associated with a limit current $I_{OC}$ which is a reference value for overcurrent protection; (ii) in the second state φ2, set the threshold voltage $V_{TH}$ to a second value $V_{TH2}$ greater than the first value $V_{TH1}$ by a predetermined percentage α, i.e., $V_{TH1} \times \alpha/100$, where α>100%; and (iii) in the third state φ3, set the threshold voltage $V_{TH}$ to a third value $V_{TH3}$ less than the first threshold voltage $V_{TH1}$ by a predetermined percentage β, i.e., $V_{TH1} \times \beta/100$, where β<100%. The control unit 30 outputs a control signal S2 indicative of the threshold voltage $V_{TH}$ of the current monitoring unit 20 in each of the states.

The state machine 34 is also configured to: (a) in the first state φ1, upon the overcurrent detection signal S1 being asserted, transition to the second state and initiate clocking by the timer 32; (b) in the second state φ2, (i) upon the overcurrent detection signal S1 being asserted, transition to the overcurrent detection state φ4, and (ii) if the overcurrent detection signal S1 remains negated for a predetermined first time $T_{IMAX}$, transition to the third φ3 state and initiate clocking by the timer 32; and (c) in the third state φ3, (i) upon the overcurrent detection signal S1 being asserted, transition to the overcurrent detection state φ4, and (ii) if the overcurrent detection signal S1 remains negated for a predetermined second time $T_{ILO}$, transition to the first state φ1.

In the overcurrent detection state φ4, the control unit 30 turns off the switch SW1. The configuration of the overcurrent detection circuit 100 has been described above. The operation of the overcurrent detection circuit 100 will be described in detail below.

Figure 3:
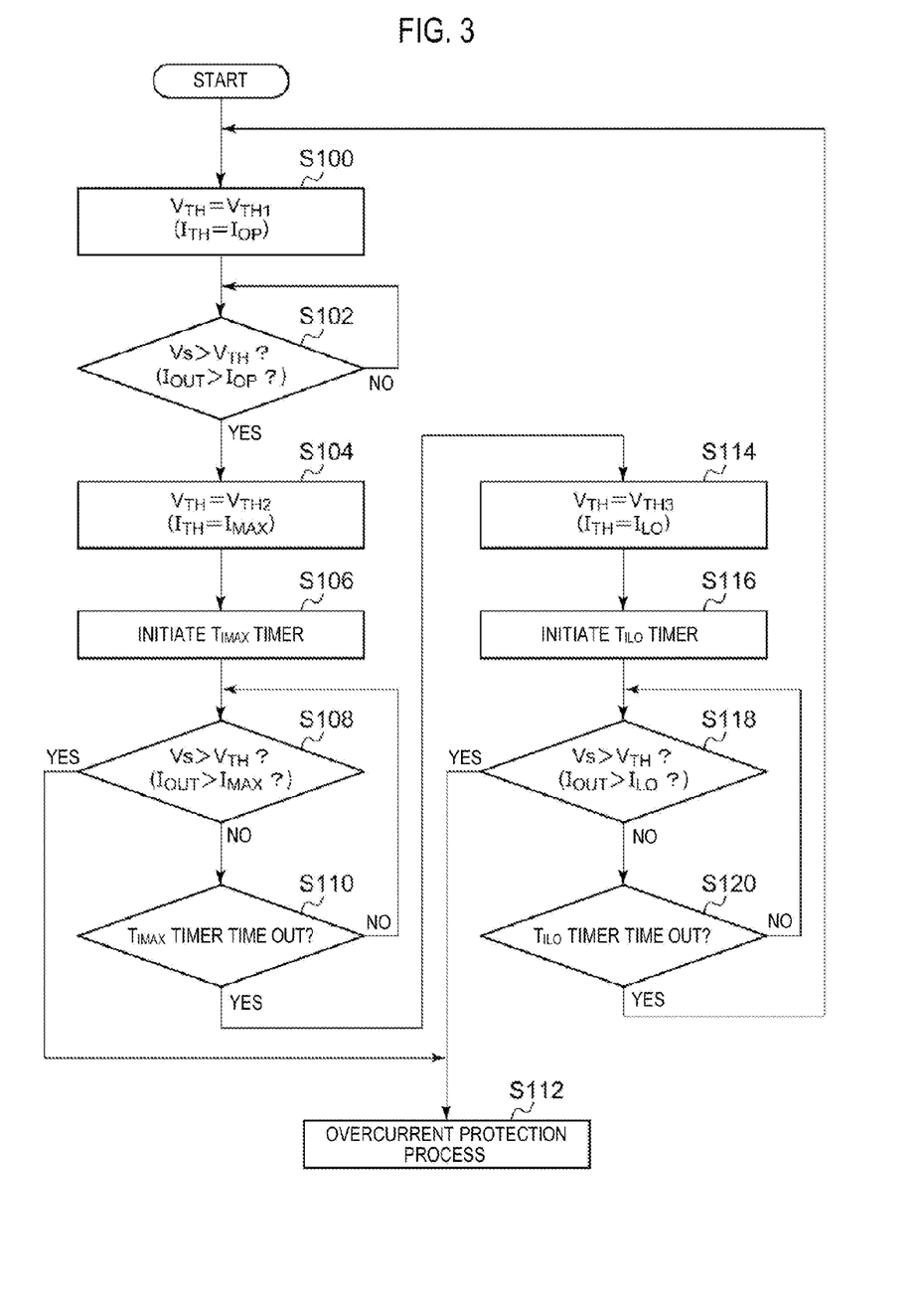
FIG. 3 illustrates a flowchart describing overcurrent detection by the overcurrent detection circuit shown in FIG. 2.
Figure 4:
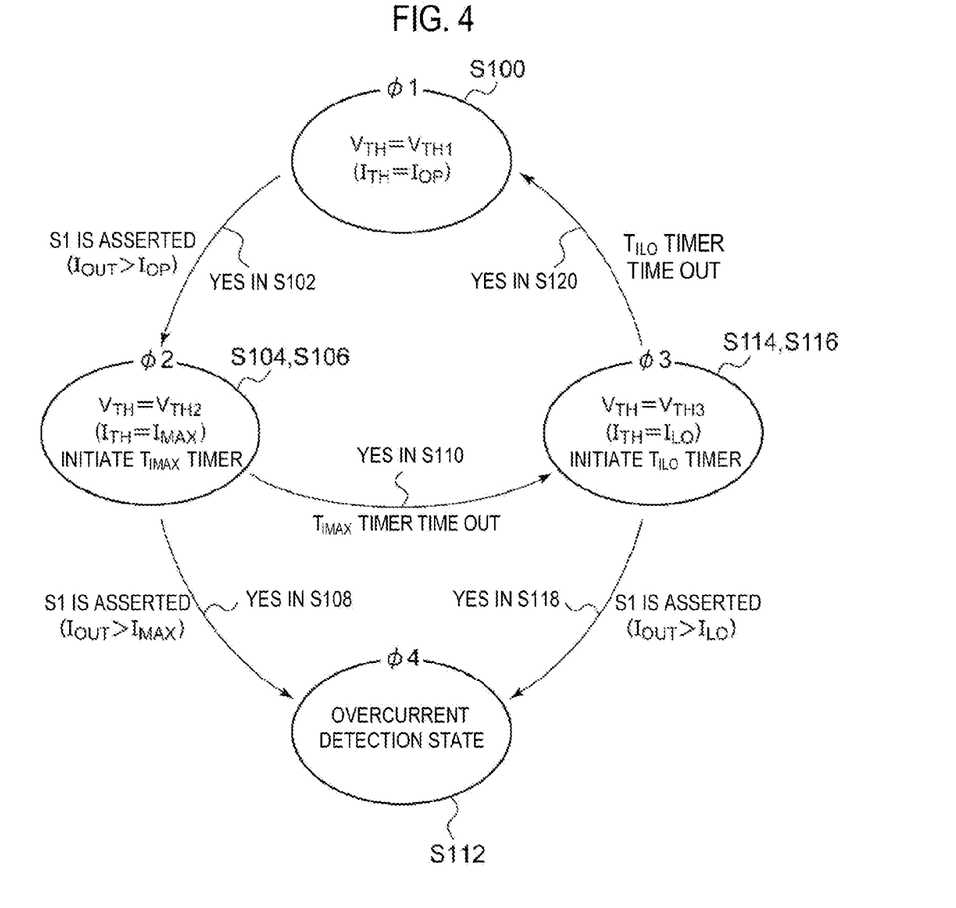
FIG. 4 depicts a state-transition diagram of the overcurrent detection circuit shown in FIG. 2.

FIG. 3 illustrates a flowchart describing overcurrent detection by the overcurrent detection circuit 100 shown in FIG. 2. FIG. 4 depicts a state-transition diagram of the overcurrent detection circuit 100 shown in FIG. 2.

When the overcurrent detection circuit 100 initiates an operation, the state machine 34 transitions to the first state φ1, in which $V_{TH}=V_{TH1}$ is set, and the overcurrent detection threshold value $I_{TH}$ becomes a limit value $I_{OC}$, which is a reference value (S100). It is determined whether Vs is greater than $V_{TH}$ in step S102. If no (No in S102), the first state φ1 is maintained. If it is determined that Vs>$V_{TH}$, i.e., $I_{OUT}>I_{OC}$ (Yes in S102), the current monitoring unit 20 asserts an overcurrent detection signal S1 and the state machine 34 transitions to the second state φ2. In the second state φ2, $V_{TH}=V_{TH2}$ is set, and the overcurrent detection threshold value $I_{TH}$ becomes the current limit $I_{MAX}$ (S104). A timer 32 for counting a first time $T_{IMAX}$ (hereinafter referred to as $T_{IMAX}$ timer 32a) is initiated (S106).

In the second state φ2, if it is determined that Vs>$V_{TH}$, i.e., $I_{OUT}>I_{MAX}$ (Yes in S108), the current monitoring unit 20 asserts an overcurrent detection signal S1 and the state machine 34 transitions to the overcurrent detection state φ4, such that an overcurrent protection process is carried out (S112). The overcurrent protection process may include turning off the switch SW1, interrupting the power source 102, notifying a microcomputer or a CPU of the overcurrent state, and so on.

In the second state φ2, while the $T_{IMAX}$ timer 32a counts the first time $T_{IMAX}$ (No in S110), the state machine 34 monitors the overcurrent detection signal S1 (S108), and remains in the second state φ2 for Vs<$V_{TH}$ (No in S108). In the second state φ2, if the $T_{IMAX}$ timer 32a expires (times out) before the overcurrent detection signal S1 is asserted, i.e., the first time $T_{IMAX}$ elapses (Yes in S110), the state machine 34 transitions to the third state φ3.

In the third state φ3, $V_{TH}=V_{TH3}$ is set, and the overcurrent detection threshold value $I_{TH}$ becomes the limit value $I_{LO}$ (S114). A timer 32 for counting a second time $T_{ILO}$ (hereinafter referred to as $T_{ILO}$ timer 32b) is initiated (S116).

In the third state φ3, if it is determined that Vs>$V_{TH}$, i.e., $I_{OUT}>I_{LO}$ (Yes in S118), the current monitoring unit 20 asserts an overcurrent detection signal S1 and the state machine 34 transitions to the overcurrent detection state φ4, such that the overcurrent protection process is carried out (S112).

In the third state φ3, while the $T_{ILO}$ timer 32b counts the second time $T_{ILO}$ (No in S120), the state machine 34 keeps monitoring the overcurrent detection signal S1 (S118), and remains in the third state φ3 while $V_s<V_{TH}$ (No in S118). In the third state φ3, if the $T_{ILO}$ timer 32b expires (times out) before the overcurrent detection signal S1 is asserted, i.e., the second time $T_{ILO}$ elapses (Yes in S120), the state machine 34 transitions to the first state φ1.

The basic operation of the overcurrent detection circuit 100 has been described above. An exemplary operation of the overcurrent detection circuit 100 will be described with reference to waveform diagrams.

Figure 5A:
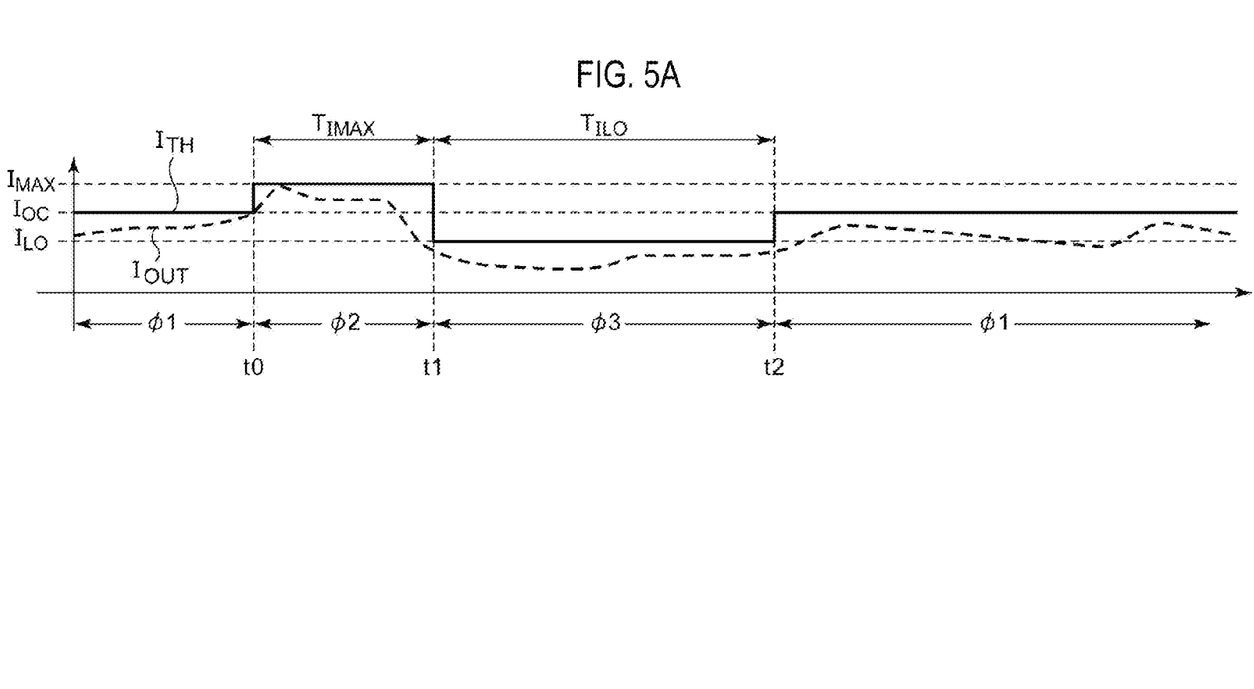
FIGS. 5A to 5C are waveform diagrams showing overcurrent detection by the overcurrent detection circuit shown in FIG. 2.
Figure 5B:
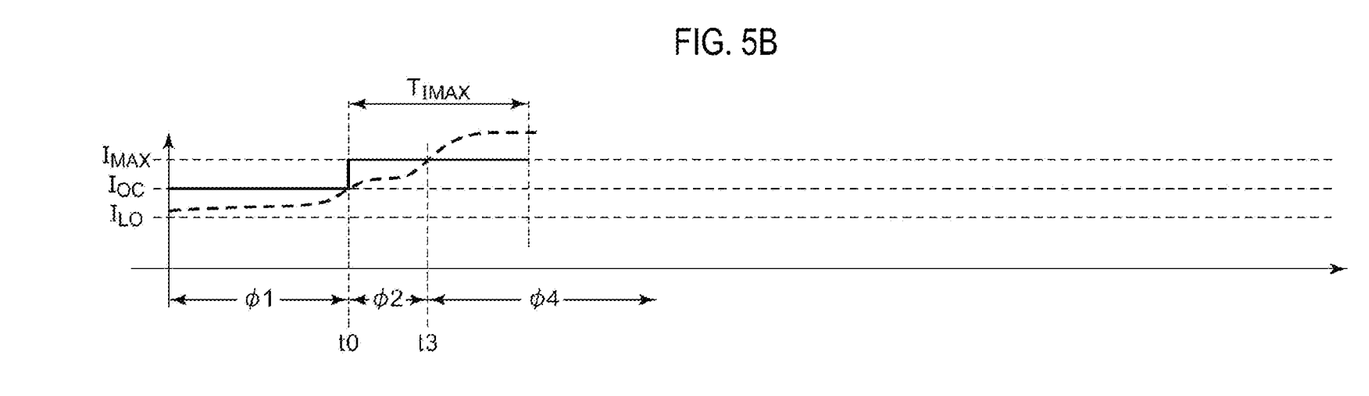
Figure 5C:
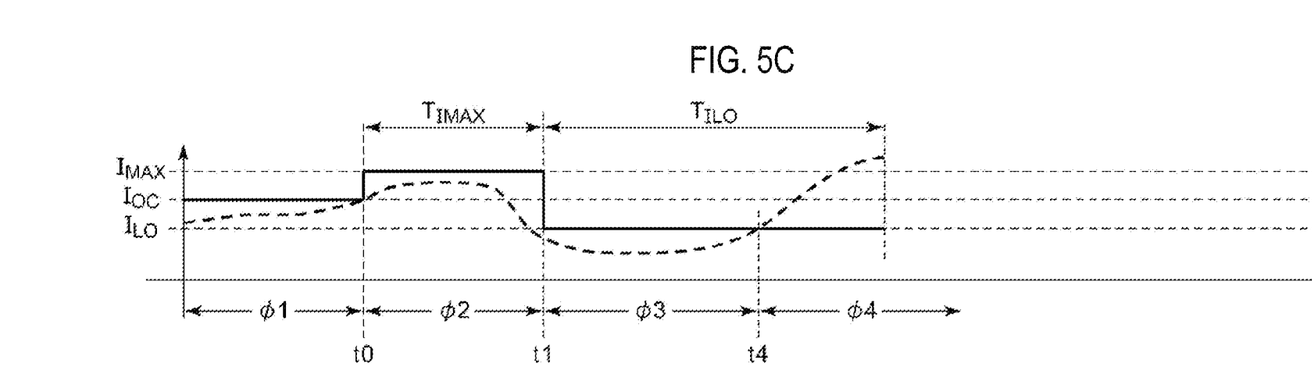

FIGS. 5A to 5C are waveform diagrams showing overcurrent detection by the overcurrent detection circuit 100 shown in FIG. 2. FIG. 5A shows waveforms when it is determined that no overcurrent occurs, and FIGS. 5B and 5C show waveforms when it is determined that an overcurrent occurs.

Initially, reference is made to FIG. 5A. Prior to time t0, the state machine 34 is in the first state φ1. If the supply current $I_{OUT}$ exceeds the threshold value $I_{TH}=I_{OC}$ at time t0, the state machine 34 transitions to the second state φ2, in which $I_{TH}=I_{MAX}$. In the second state φ2, if the first time $T_{IMAX}$ elapses while $I_{OUT}<I_{TH}$ ($I_{OUT}<I_{MAX}$), the state machine 34 transitions to the third state φ3, in which $I_{TH}=I_{LO}$ (at time t1). In the third state φ3, if the second time $T_{ILO}$ elapses while $I_{OUT}<I_{TH}$ ($I_{OUT}<I_{LO}$), the state machine 34 returns to the first state φ1 (at time t2).

Next, reference is made to FIG. 5B. Prior to time t0, the same operation is performed as in FIG. 5A. At time t0, the state machine 34 transitions to the second state φ2. In the second state φ2, if it is determined that $I_{OUT}>I_{TH}$ ($I_{OUT}>I_{MAX}$) occurs at time t3 before the first time $T_{IMAX}$ elapses, the state machine 34 transitions to the overcurrent detection state φ4.

Subsequently, reference is made to FIG. 5C. Prior to time t1, the same operation is performed as in FIGS. 5A and/or 5B. At time t1, the state machine 34 transitions to the third state φ3. In the third state φ3, if it is determined that $I_{OUT}>I_{TH}$ ($I_{OUT}>I_{LO}$) occurs at time t4 before the second time $T_{ILO}$ elapses, the state machine 34 transitions to the overcurrent detection state φ4.

The operation of the overcurrent detection circuit 100 has been described above.

According to the overcurrent detection circuit 100, the overcurrent detection that meets the peak current requirement of the USB-PD specification is possible. Additionally, the overcurrent detection circuit 100 can be fully compliant with other specifications.

More specifically, unlike the overcurrent detection circuit 100r shown in FIG. 1, which is unable to detect an overcurrent during the masking time, the overcurrent detection circuit 100 does not mask the overcurrent detection signal S1 and thus can securely detect an overcurrent state even during masking time. As such, the overcurrent detection circuit 100 can improve system stability.

In addition, the threshold value of the current monitoring unit 20 may be set as desired by the control unit 30, and thus a precise current control is possible adaptively. As a result, power consumption can be saved.

(Applications)

Applications of the overcurrent detection circuit 100 will be described.

Figure 6:
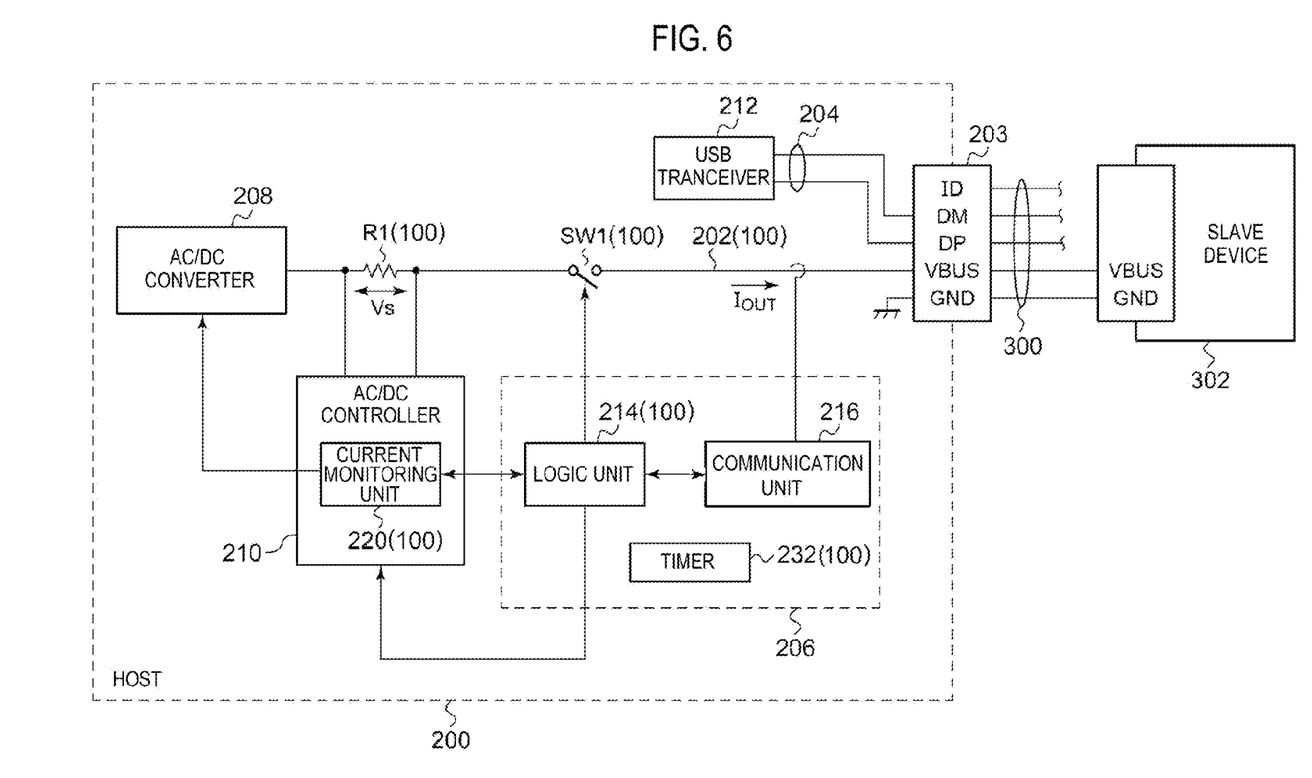
FIG. 6 describes a block diagram of a host employing the overcurrent detection circuit shown in FIG. 2.

FIG. 6 is a block diagram of a USB host 200 employing the overcurrent detection circuit 100 shown in FIG. 2. The USB host 200 is compliant with the USB-PD specification and is connected to a USB device 302 via a USB cable 300.

The USB host 200 includes a power supply line 202, a USB port 203, a data line 204, a switch SW1, a detection resistor R1, a USB-PD controller 206, a converter 208, a converter controller 210, and a USB transceiver 212.

The switch SW1 and the detection resistor R1 are connected in series on the power supply line 202.

The USB-PD controller 206 negotiates a bus voltage $V_{BUS}$ and a supply current $I_{OUT}$ to be supplied via the power supply line 10, with a device (device in synchronization) 302 compliant with the USB-PD specification via the power supply line 202. The USB-PD controller 206 includes a logic unit 214, a communication unit 216, and a timer 232. The communication unit 216 is coupled with the power supply line 202 and communicates with the USB device 302 by superimposing a modulation signal on the bus voltage $V_{BUS}$ (the FSK scheme).

The logic unit 214 controls the switch SW1. In addition, the logic unit 214 notifies the converter controller 210 of a set value of the bus voltage $V_{BUS}$ which is the result of the negotiation. The logic unit 214 corresponds to the state machine 34 shown in FIG. 2.

An output terminal of the converter 208 is connected to the power supply line 202 to generate the bus voltage $V_{BUS}$. The converter 208 may be an AC/DC converter that converts an AC voltage into a DC voltage, for example. Alternatively, the converter 208 may be a DC/DC converter that steps down or steps up a battery voltage or a DC voltage from an external adaptor, for example. The topology of the converter 208 is not particularly limited herein.

The converter controller 210 controls the converter 208 so that the converter 208 outputs the voltage level determined by the negotiation. Again, the configuration of the converter controller 210 is not particularly limited herein, and any suitable known converter controller may be employed.

The converter controller 210 includes a current monitoring unit 220 that compares the detected voltage Vs, i.e., the voltage drop across the detection resistor R1 with a variable threshold voltage $V_{TH}$ and asserts an overcurrent detection signal S1 if the detected voltage Vs exceeds the threshold voltage $V_{TH}$. The current monitoring unit 220 corresponds to the current monitoring unit 20 shown in FIG. 2.

The USB-PD controller 206 includes a timer 232. The logic unit 214 has the functionality of the state machine 34 shown in FIG. 2 and is able to switch between a first state ϕ1 to a third state ϕ3 and an overcurrent detection state ϕ4. In addition, the logic unit 214 is able to transition between the first state ϕ1 to the third state ϕ3 and the overcurrent detection state ϕ4 based on the same conditions as the state machine 34. The logic unit 214 turns off the switch SW1 in the overcurrent detection state ϕ4.

The configuration of the USB host 200 has been described above. The operation of the USB host 200 will be described in detail below. As a result of the negotiation between the USB-PD controller 206 and the USB device 302, overcurrent protection conditions are determined, as well as the capacity of the bus voltage $V_{BUS}$ or the supply current $I_{OUT}$.

The overcurrent protection conditions contain the following information:

The ratio α of the limit value $I_{MAX}$ to the reference value $I_{OC}$ $(=I_{MAX}/I_{OC})$ The ratio β of the limit value $I_{LO}$ to the reference value $I_{OC}$ $(=I_{LO}/I_{OC})$ The first time $T_{IMAX}$ The duty ratio γ between the second time $T_{ILO}$ and the first time $T_{IMAX}$ These conditions may be expressed in two-bit data S3, for example:

(S3=00) α=100%, β=N/A, $T_{IMAX}$=1 ms, (S3=01) α=130%, β=70%, $T_{IMAX}$=1 ms, $T_{ILO}$=1 ms, (γ=50%)

(S3=10) α=150%, β=83%, $T_{IMAX}$=1 ms, $T_{ILP}$=3 ms, (γ=25%)

(S3=11) α=200%, β=95%, $T_{IMAX}$=1 ms, $T_{ILO}$=19 ms (γ=5%)

where the abbreviation N/A stands for "Not Available," which means there is no setting.

According to this USB host 200, by employing the overcurrent detection circuit 100, it is possible to support the peak current requirement of the USB-PD specification.

Figure 7:
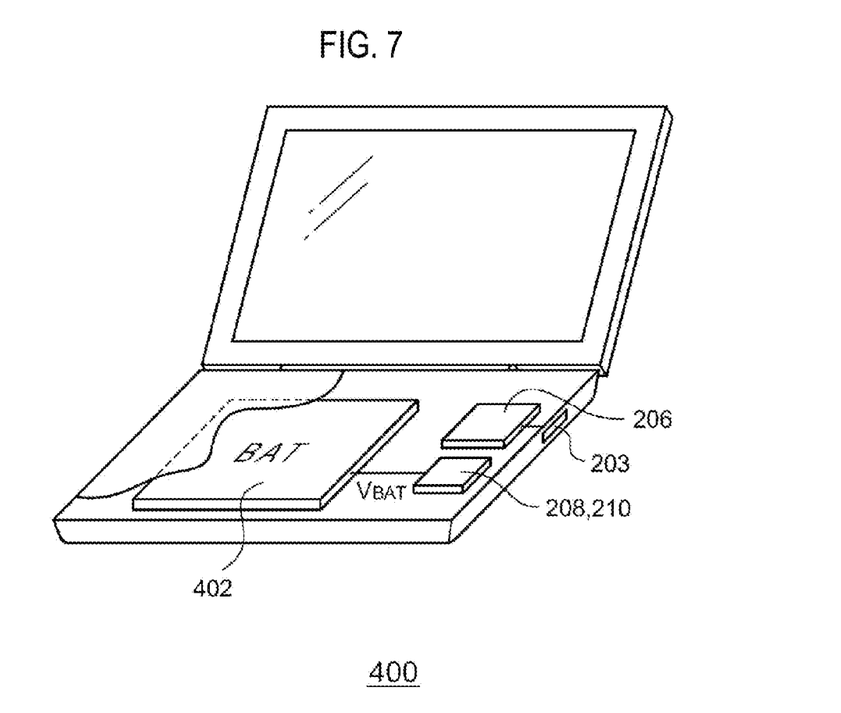
FIG. 7 is a perspective view of a note-type computer as an example of the host.

FIG. 7 shows a perspective view of a note-type computer 400 as an example of the USB host 200.

A secondary battery 402 is, for example, a lithium-ion battery, a nickel-hydrogen battery, etc., and outputs a battery voltage $V_{BAT}$. The converter 208 and the converter controller 210 steps up or steps down the battery voltage $V_{BAT}$ and generates the bus voltage $V_{BUS}$. To the USB port 203, a device (not shown) is connected via a USB cable.

The present disclosure has been described with reference to the exemplary embodiments.

It should be understood by those skilled in the art that the above embodiments are merely examples and a variety of modifications may be made to combinations of the elements and processes disclosed herein, and that such modifications also fall within the scope of the present disclosure. Hereinafter, such modifications are described.

(First Modification)

In the above exemplary embodiments, the control unit 30 includes the state machine 34 as a part of it. However, the configuration of the control unit 30 is not limited thereto. Instead of the state machine 34, other architectures such as a combination of software and hardware, etc. may be employed.

(Second Modification)

Although the switch SW1 is connected between the detection resistor R1 and the USB port 104 in the above-described embodiments, the present disclosure is not limited thereto. The switch SW1 may be connected between the detection resistor R1 and the power source 102. Alternatively, if the power source 102 is an AC/DC converter or a DC/DC converter, a switching transistor included in the power source of the converters may also be served as the switch SW1. Or, if the power source 102 is a low drop output (LDO), the output transistor (power transistor) may also be used as the switch SW1.

(Third Modification)

In the above exemplary embodiment, as shown in FIG. 6, the USB host 200 and the USB device 302 communicate with each other by superimposing a modulation signal on the bus voltage $V_{BUS}$ (the FSK scheme) according to the USB-PD specification. However, the present disclosure is not limited thereto. The present disclosure can also be compliant with other future specifications. For example, the USB host 200 may communicate with the USB device 302 via a dedicated communication channel installed separately from the power supply line 202.

(Fourth Modification)

The note-type computer 400 has been described as an application of the overcurrent detection circuit 100. However, the USB host 200 may include a mobile phone terminal, a tablet terminal, a digital camera, a digital video camera, a television receiver etc.

According to some aspects of the present disclosure, overcurrent detection that meets the peak current requirement of the USB-PD specification is possible While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An overcurrent detection circuit installed in a host for supplying power to a device, the circuit comprising:
  a detection resistor disposed on a power supply line;
  a current monitoring unit that compares a detected voltage that is a voltage drop across the detection resistor with a variable threshold voltage and asserts an overcurrent detection signal if the detected voltage exceeds the threshold voltage; and
  a control unit including a timer, wherein the control unit is switchable among (i) a first state where the threshold voltage is set to a first value is in accordance with a reference value for overcurrent protection, (ii) a second state where the threshold voltage is set to a second value that is greater than the first value, and (iii) a third state where the threshold voltage is set to a third value that is less than the first value, wherein the control unit is configured to:
  (a) in the first state, if the overcurrent detection signal is asserted, transition to the second state while initiating clocking by the timer;
  (b) in the second state, (i) if the overcurrent detection signal is asserted, transition to an overcurrent detection state, and (ii) if the overcurrent detection signal remains negated for a predetermined first time period, transition to the third state while initiating clocking by the timer; and
  (c) in the third state, (i) if the overcurrent detection signal is asserted, transition to the overcurrent detection state, and (ii) if the overcurrent detection signal remains negated for a predetermined second time period, transition to the first state.

2. The circuit of claim 1, further comprising:
  a switch disposed on the power supply line in series to the detection resistor, wherein the control unit turns off the switch in the overcurrent detection state.

3. The circuit of claim 1, wherein the host is compliant with a universal serial bus power delivery (USB-PD) specification.

4. A host compliant with a USB-PD specification, the host comprising:
  a detection resistor and a switch disposed on a power supply line in series to each other;
  a USB-PD controller that controls the switch and negotiates a bus voltage and a supply current to be supplied via the power supply line, with a device compliant with the USB-PD specification via the power supply line;
  a converter that has an output terminal connected to the power supply line and generates the bus voltage; and
  a converter controller that controls the converter so that a voltage level determined by the negotiation is output,
  wherein the converter controller comprises a current monitoring unit that compares a detected voltage that is a voltage drop across the detection resistor with a variable threshold voltage and asserts an overcurrent detection signal if the detected voltage exceeds the threshold voltage, and
  wherein the USB-PD controller comprises a timer and is switchable among (i) a first state where the threshold voltage is set to a first value that is in accordance with a reference value for overcurrent protection, (ii) a second state where the threshold voltage is set to a second value that is greater than the first value by a predetermined percentage, and (iii) a third state where the threshold voltage is set to a third value that is less than the first value by a predetermined percentage, wherein the USB-PD controller is configured to:
  (a) in the first state, if the overcurrent detection signal is asserted, transition to the second state while initiating clocking by the timer;
  (b) in the second state, (i) if the overcurrent detection signal is asserted, turn off the switch, and (ii) if the overcurrent detection signal remains negated for a predetermined first time period, transition to the third state while initiating clocking by the timer; and
  (c) in the third state, (i) if the overcurrent detection signal is asserted, turn off the switch, and (ii) if the overcurrent detection signal remains negated for a predetermined second time period, transition to the first state.

5. A method of detecting an overcurrent performed in a host compliant with a USB specification, the method comprising:
  setting an overcurrent threshold value to a first value that is a reference value;
  comparing a supply current flowing through a power supply line with the first value;
  setting the overcurrent threshold value to a second value that is larger than the reference value by a predetermined percentage while initiating clocking by a first timer if the supply current exceeds the threshold value;
  (i) determining an overcurrent state if the supply current exceeds the threshold value before a time counted by the first timer reaches a predetermined first time, and (ii) setting the overcurrent threshold value to a third value that is less than the reference value by a predetermined percentage while initiating clocking by a second timer if the supply current remains less than the threshold value for the first time; and
  (i) determining an overcurrent state if the supply current exceeds the threshold value before a time counted by the second timer reaches a predetermined second time, and (ii) setting the overcurrent threshold value to the first value, if the supply current remains less than the threshold value for the second time.

* * * * *